(12) United States Patent
Volokh (10) Patent No.: US 8,668,413 B2
(45) Date of Patent: Mar. 11, 2014

(54) COUPLER FOR A QUICK CHANGE INSERT ROTARY CUTTING TOOL

(75) Inventor: Vladimir David Volokh, Maalot (IL)

(73) Assignee: Kennametal Inc., Latrobe, PA (US)

( * ) Notice: Subject to any disclaimer, the term of this patent is extended or adjusted under 35 U.S.C. 154(b) by 379 days.

(21) Appl. No.: 12/973,369

(22) Filed: Dec. 20, 2010
(Under 37 CFR 1.47)

(65) Prior Publication Data

US 2011/0211921 A1 Sep. 1, 2011

(30) Foreign Application Priority Data

Dec. 31, 2009 (IL) .......................................... 203097

(51) Int. Cl.
*B23B 31/113* (2006.01)

(52) U.S. Cl.
USPC .......................... 409/234; 279/93; 408/239 R (58) Field of Classification Search
USPC .............. 279/99, 8, 93; 408/233, 238, 239 R, 408/239 A; 409/234
See application file for complete search history.

(56) References Cited

U.S. PATENT DOCUMENTS

| | | | |
|---|---|---|---|
| 1,636,669 A | 7/1927 | Blauvelt | |
| 2,219,907 A * | 10/1940 | Ross ................................ | 279/93 |
| 2,379,984 A | 7/1945 | Nereaux | |
| 3,171,666 A | 3/1965 | Benjamin et al. | |
| 4,478,541 A | 10/1984 | Okada et al. | |
| 4,784,543 A | 11/1988 | Mitchell et al. | |
| 4,850,759 A | 7/1989 | Strand et al. | |
| 4,909,684 A * | 3/1990 | Kelm et al. ................... | 409/234 |
| 5,593,258 A * | 1/1997 | Matsumoto et al. .......... | 409/234 |
| 6,565,291 B2 | 5/2003 | Harpaz et al. | |
| 6,811,364 B2 | 11/2004 | Kelzer | |
| 6,939,213 B2 | 9/2005 | Lovchik et al. | |
| 7,004,692 B2 | 2/2006 | Hecht | |
| 7,101,127 B2 * | 9/2006 | Kimura et al. ................ | 409/232 |
| 7,101,128 B2 | 9/2006 | Hansson | |
| 7,407,351 B2 * | 8/2008 | Pantzar et al. ................ | 409/234 |
| 7,513,724 B2 * | 4/2009 | Kakai ............................ | 409/234 |
| 7,611,311 B2 | 11/2009 | Kakai et al. | |
| 7,713,004 B2 | 5/2010 | Lehto et al. | |
| 7,753,628 B2 * | 7/2010 | Hecht et al. ................... | 408/233 |
| 7,775,751 B2 | 8/2010 | Hecht et al. | |
| 2003/0210963 A1 | 11/2003 | Kakai et al. | |
| 2006/0127194 A1 | 6/2006 | Schafer | |
| 2009/0116920 A1 | 5/2009 | Bae | |
| 2010/0098500 A1 | 4/2010 | Weaver et al. | |
| 2010/0272533 A1 | 10/2010 | Hecht | |
| 2012/0009027 A1 * | 1/2012 | Sharivker et al. ............. | 407/42 |

FOREIGN PATENT DOCUMENTS

| | | |
|---|---|---|
| GB | 2158374 A * | 11/1985 |
| JP | 2001087929 A * | 4/2001 |
| JP | 2003200311 A * | 7/2003 |

* cited by examiner

*Primary Examiner* — Daniel Howell
*Assistant Examiner* — Nicole N Ramos
(74) *Attorney, Agent, or Firm* — Larry R. Meenan, Esq.

(57) ABSTRACT

A coupler for a quick change rotary cutting tool assembly allowing a cutter to be quickly and releasably coupled to a shank wherein the coupler has a cylindrical portion with a threaded portion to engage the shank and a portion with a transverse groove with undercut walls to form recesses. The cutter has an anchor made as a disk with parallel flats which engage the recesses of the cylindrical portion to releasably secure the cutter to the shank.

26 Claims, 10 Drawing Sheets

COUPLER FOR A QUICK CHANGE INSERT ROTARY CUTTING TOOL

FIELD OF THE INVENTION

The present invention relates to rotary cutting tools, more particularly to improvements in a quick change coupler for replaceable insert rotary cutting tools.

BACKGROUND OF THE INVENTION

End mills for metal cutting machinery have conventionally been produced as a single unit, comprising a fluted cutting portion and a cylindrical or conical shank portion sized to fit a machine spindle. However the increasing global pricing of modern tool alloys along with recently developed intricate surface treatment make it less economical, as the expensive shank material is wasted. It is therefore becoming common practice to produce a separate cutter (insert) made of high quality alloy or sintered carbide, which is then concentrically attached to the end of a reusable steel shank.

It is highly desirable that the cutter be easily replaced, upon wear, while leaving the shank in the machine spindle, such that no further adjustments are required after cutter replacement. A major requirement related to such accurate milling applications is that each replacement cutter be centered with repeatable accuracy to the true spindle axis of rotation and axially positioned correctly.

Currently, the majority of interchangeable cutter-shank combinations use a plain straight or conical thread coupler directly joining the cutter to the shank. Those tools require at least three turns of the cutter to completely withdraw the cutter from the shank. In an effort to reduce labor and machine downtime, it is desirable that the time interval required for cutter replacement be minimal.

It is known in the art of replaceable cutting tools, to reduce cutter interchange time by the aid of a quick release bayonet type rotative coupler, typically attaching a rear end section of a cutter to a front end section of a bolt, wherein both the bolt and the cutter are inserted together into a mounting hole having an appropriate centering surface for the cutter and a female thread provided in a shank. As a result of the male thread of the bolt engaging the female thread of the mounting hole, the cutter is drawn by the bolt and through the quick release rotative coupler towards the rear end side in the axial direction of the shank. The assembly is secured by tightening the cutter at the end of the thread stroke with a spanner. Upon applying the spanner in the opposite direction, the thread is initially slackened and the bayonet type rotative coupler is released, enabling quick change of the cutter with no need to slacken the entire length of the thread.

International class B23B 31/113 relates to quick release devices for spindle type cutting tools having bayonet couplers. Representative prior art is disclosed in U.S. Pat. Nos. 2,219,907 2,379,984 4,478,541 4,784,543 7,101,127 and U.S. Publication No. 2006/0127194.

U.S. Pat. No. 7,101,127 describes a cutter with a rear conical centering portion coaxially coupled to a two or three arm hook portion or anchor. The anchor is rotatively retained by bayonet action within a coupler in the form of a socket having a threaded rear portion for threadably engaging a tool shank. The socket, as shown in detail in FIG. 23A, has a shaped bore accessible from a front end of the socket for accommodating the bayonet and is undercut on opposing internal surfaces so as to form opposing recesses that retain mating surfaces of the anchor aims when the cutter is inserted and twisted. The assembly further includes stopper means limiting the relative rotation between the cutter and the socket to ensure correct positioning of the anchor arms. A similar arrangement is taught by US 2006/0127194 as shown in detail in FIGS. 2 and 6 thereof.

The need to provide such an undercut complicates the manufacturing process of the coupler, such action being particularly awkward when the coupler is closed around its periphery since access from the front end is restricted.

It would therefore be desirable to provide an improved bayonet type coupler for a quick release rotary cutting tool, where the need to provide undercuts in the socket is avoided.

SUMMARY OF THE INVENTION

It is an object of the present invention to provide an alternative quick change system for a quick release rotary cutting tool, which addresses the above requirement.

According to one aspect of the invention there is provided a coupler for a quick change rotary cutting tool assembly allowing a cutter having an anchor projecting from a rear stop face of the cutter abutting a centering portion to be quickly and releasably coupled to a shank having a centering portion within an internal mounting bore, the coupler comprising:

a cylindrical portion supporting at a rear end a coaxial male threaded portion for engaging an internal threaded bore of the shank, and a transversal groove diametrically formed through the cylindrical portion and being open toward a front end surface of the cylindrical portion so as to form an open channel having opposing parallel walls dimensioned to accommodate opposing parallel flat surfaces of an anchor mounted at a rear end of the cutter;

a partial inside surface of a first one of the walls and an angularly opposing partial inside surface of a second one of the walls being undercut toward a lower surface of the groove so as to form a pair of angularly offset recesses at respective opposite ends of the groove that engage a retaining surface of the anchor when the anchor is inserted into the groove and rotated in a locking direction.

According to another aspect of the invention there is provided a quick change rotary cutting tool assembly comprising such a coupler.

In accordance with one embodiment, the shank of such a quick change rotary cutting tool assembly comprises:

an internal mounting bore situated at a front end thereof so as to form an annular front edge that serves as a stop face, a centering portion that is complementary to a centering portion of the cutter at a front end of the internal bore, a free cavity rearward of the centering portion of sufficient depth to accommodate the cylindrical portion of the coupler, and a female threaded bore rearward of the free cavity sized to accept the male threaded portion of the coupler.

BRIEF DESCRIPTION OF THE DRAWINGS

In order to understand the invention and to see how it may be carried out in practice, embodiments will now be described, by way of non-limiting example only, with reference to the accompanying drawings, in which.

DETAILED DESCRIPTION OF EMBODIMENTS

In the following description of some embodiments, identical components that appear in more than one figure or that share similar functionality will be referenced by identical reference symbols.

With reference to FIGS. 1 to 4, there is shown a quick change rotary cutting tool assembly 10, made in accordance with an embodiment of the present invention. The cutting tool assembly 10 has a shank 12, a coupler 14 and a cutter or insert 16, all of which are mutually compatible and independently replaceable. The visible portion of the cutter 16 shown in FIG. 1 when assembled may include an active fluted portion 18 coupled to a short cylindrical portion 20. The cylindrical portion 20 is preferably equipped with at least two opposing parallel flats 22 for allowing the insert to be gripped by a spanner. Although in the figure, the cutter 16 is shown as an end mill, it will be understood that it may equally well be a face mill, rounded tip mill, slitting mill, drill, reamer, or any other replaceable tip for milling, drilling, reaming or other metal cutting applications that use rotary cutting tools.

The cutter 16 further comprises a rear stop face 30 (FIG. 2) projecting from which is a conical centering portion 32 supporting a coaxial stem 34 and a dual arm anchor 36 integral with the cutter 16. The anchor 36 is in the form of a disk trimmed on opposing edges to form a pair of curved retaining arms 37 and parallel flats 38.

Figure 4:
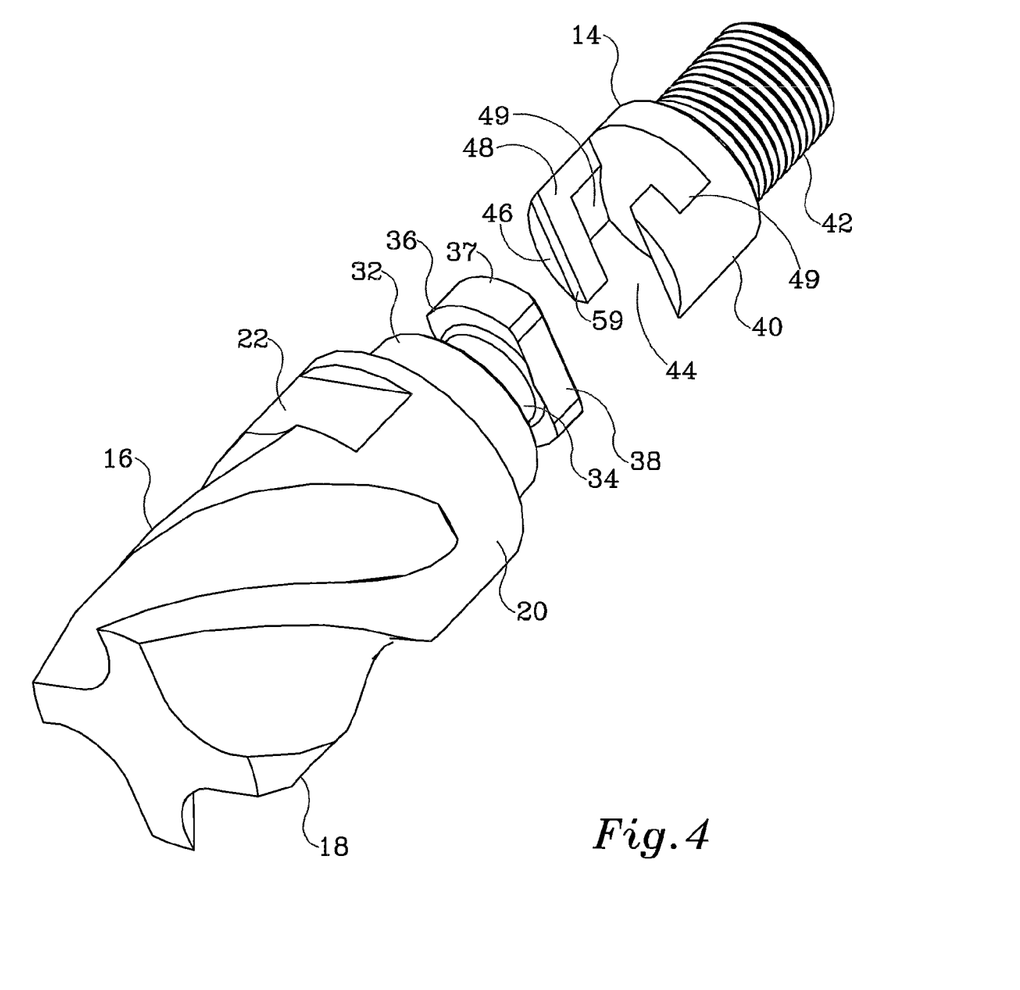
FIG. 4 is an enlarged exploded perspective view of the cutter and the coupler shown in FIG. 2.

As shown in FIG. 4, the coupler 14 comprises a cylindrical portion 40 supporting at a rear end a coaxial male threaded portion 42. A transversal groove 44 is diametrically formed through the cylindrical portion 40, open towards a front end surface thereof so as to form an open channel having opposing parallel walls 48 of sufficient width to accommodate the parallel flats 38 of the anchor 36. A partial inside surface of one wall and an angularly opposing partial inside surface of the other wall are undercut toward the lower surface of the channel, so as to form a pair of 180° angularly offset identical recesses 49 at respective opposite ends of the groove. The groove 44 and the associated recesses 49 can be easily produced by a standard milling operation, leaving arched recesses 49 as shown in FIG. 4, or optionally can be formed using a wire EDM machine forming flat triangular prism shaped recesses (not shown). In any case, the required machining is done from an easily accessible open peripheral and front surfaces of the coupler, unlike known couplers of the kind described above, where access for machining the undercut is limited to the front shaped opening.

Figure 1:
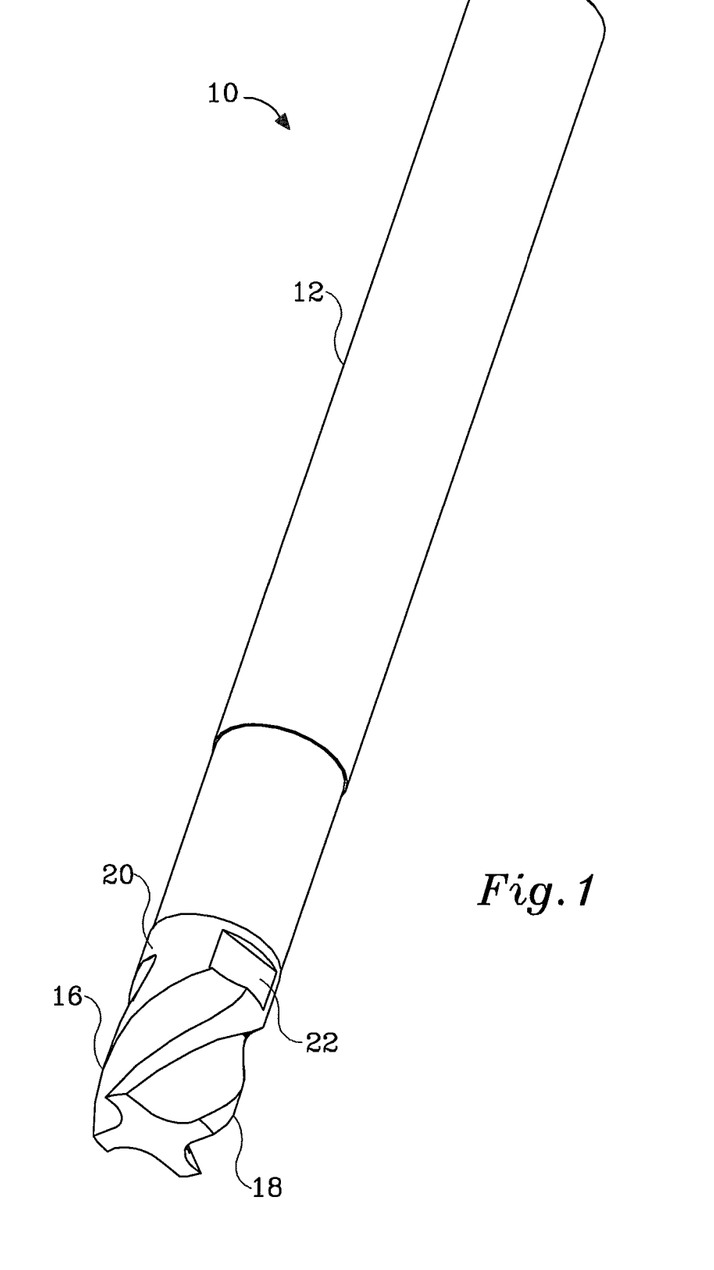
FIG. 1 is a perspective view of an assembled quick change cutting tool.
Figure 2:
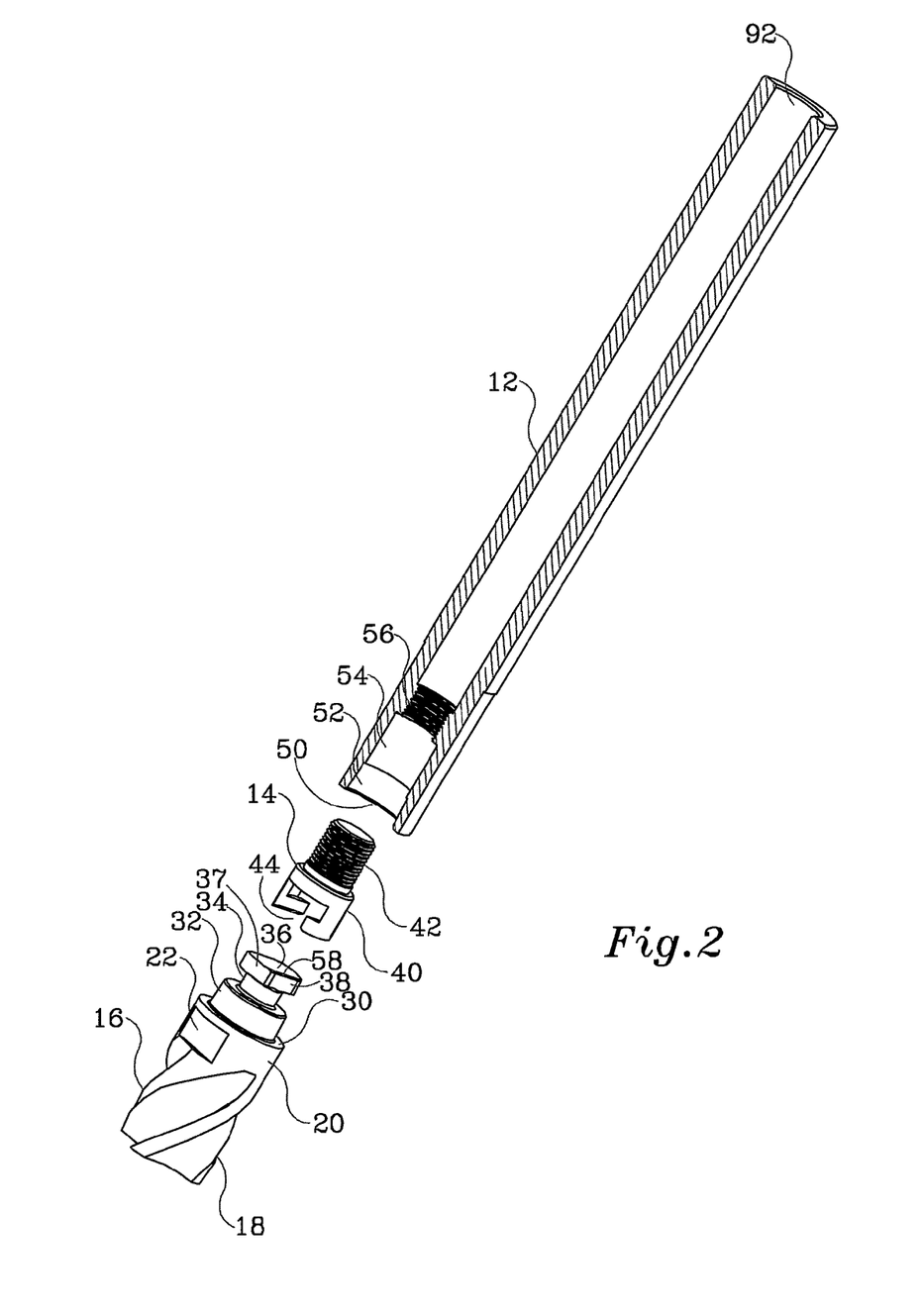
FIG. 2 is an exploded perspective view of a quick change cutting tool according to a first embodiment of the present invention.
Figures 3A, 3B, 3C:
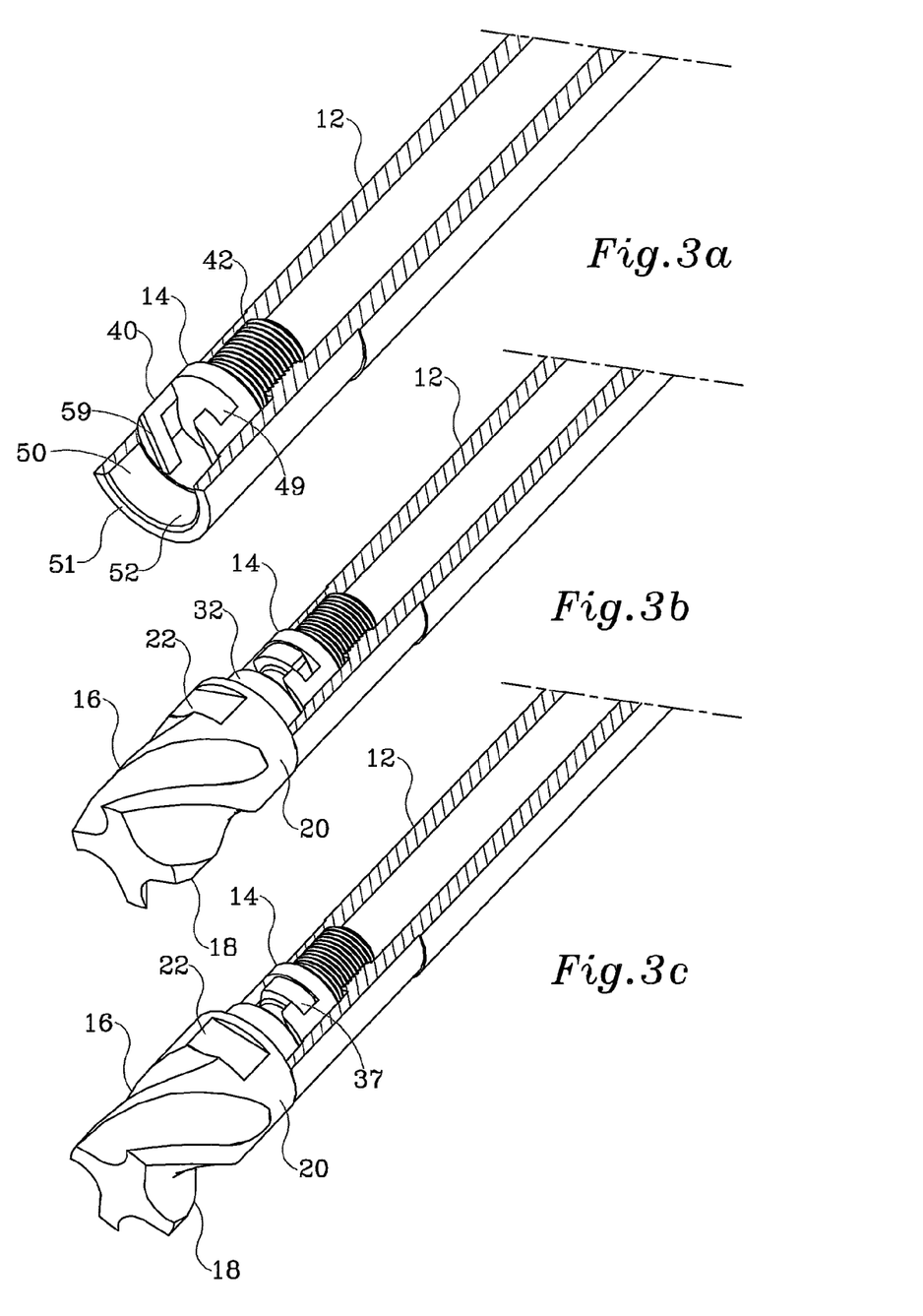
FIGS. 3a, 3b, 3c are enlarged perspective views of the quick change tool shown in FIG. 2, shown in different stages of assembly.

The shank 12 has an internal mounting bore 50 situated at the front end of the shank 12 so as to form an annular front edge that serves as a stop face 51 (FIG. 3a). A rear end of the internal bore 50 adjoins a front end of a conical centering portion 52 that is complementary with the conical centering portion 32 of the cutter 16. A rear end of the conical centering portion 52 abuts a free cavity 54 of sufficient depth to accommodate the cylindrical portion 40 of the coupler 14, at a rear end of which is a female threaded bore 56 (FIG. 2) sized to accept the male threaded portion 42 of the coupler 14. Preferably, the internal diameter of the free cavity 54 of the shank 12 is made in close tolerance to the diameter of the cylindrical portion 40 of the coupler 14, thus eliminating the risk of the opposing walls 48 of the groove being splayed apart by the pulling force during operation.

With further reference to FIGS. 3a, 3b, 3c, during assembly the coupler 14 is initially inserted into the bore 50 of the shank 12 and rotated so as cause the threaded portion 42 of the coupler 14 to engage the threaded bore 56 of the shank 12 as in FIG. 3a. Thereafter, the cutter 16 is inserted with the anchor 36 being directed into the groove 44, as shown in FIG. 3b and rotated in a locking direction, which is typically clockwise as shown in the figure, until it is locked as shown in FIG. 3c, whereby the retaining aims 37 are fully engaged by the angularly opposed recesses 49 of the coupler. In this position, a rear surface of the retaining arms 37, i.e. the surface from which the stem 34 projects, serves as a retaining surface that is engaged by a corresponding surface inside the recesses 49 of the coupler 14. Further rotation of the cutter with a spanner will tighten the thread engagement and lock the cutter in its working position, whereby the rear stop face 30 of the cutter 16 abuts the front stop face 51 of the shank 12. In this position, the simultaneous mutual engagement of the stop faces 30, 51 combined with the contact between the conical centering portions 32, 52 of the cutter and shank respectively, contribute to the rigidity of the joint and ensure repeated accuracy of a replacement cutter in terms of concentricity and longitudinal position.

Although the centering portions 32, 52 are described above as conical, it will be understood that cylindrical centering portion are also possible.

Upon rotating the cutter 16 in the opposite direction the thread is slightly slackened, allowing the release of the bayonet type rotative joint typically within a quarter of a turn of the cutter 16. This enables quick change of the cutter 16 with no need to slacken the entire length of the thread. As shown in FIGS. 2, 4, chamfers 58, 59 are provided along the rear edges of the anchor flats 38, and along the front edges of the groove 44, respectively, thus facilitating self-alignment of a replacement cutter 16 within the groove 44 of the coupler 14.

Figure 5:
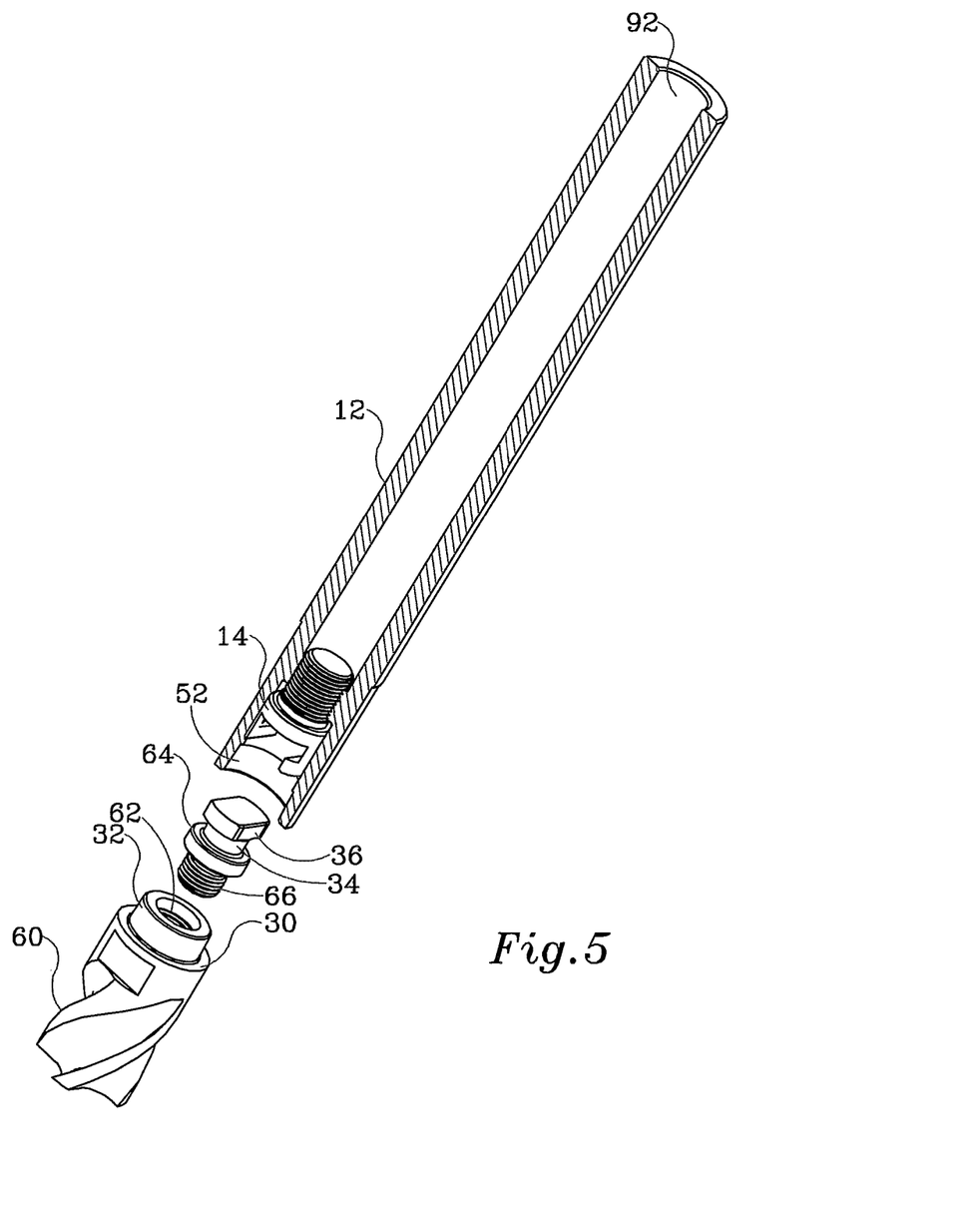
FIG. 5 is an exploded perspective view of a quick change cutting tool according to a second embodiment of the present invention.
Figure 6:
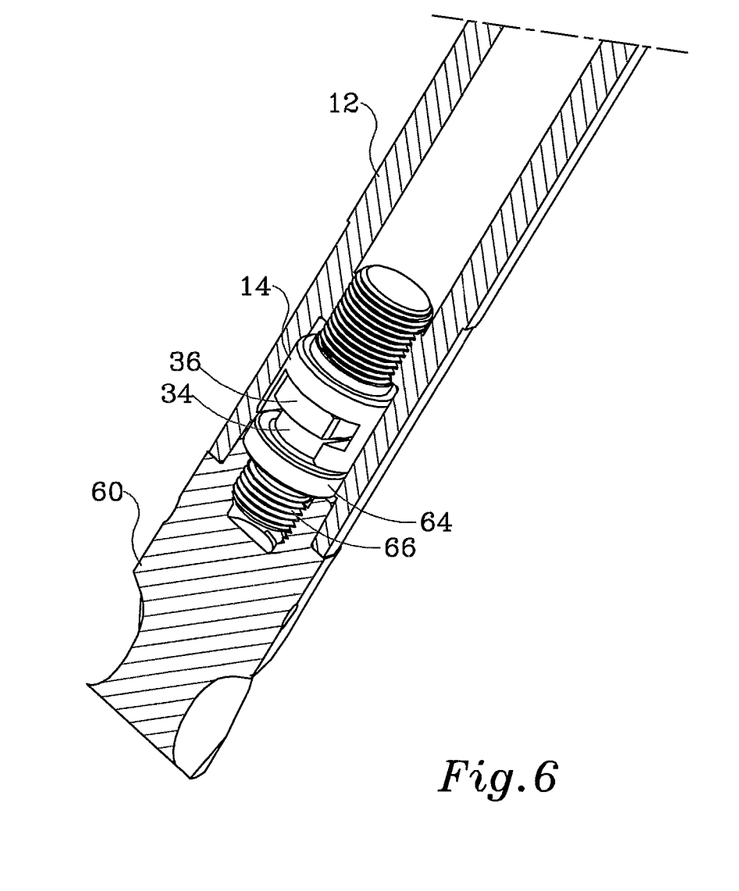
FIG. 6 is an enlarged perspective view of the assembled quick change cutting tool shown in FIG. 5, the shank and the cutter being shown in longitudinal section.

With reference to FIGS. 5 and 6, there is shown a cutter 60 according to a second embodiment that is similar to the first embodiment, except that instead of the anchor 36 being integral with the cutter 16, it is adapted for releasable coupling thereto. To this end, the cutter 60 is provided at its rear end with an internal thread 62 for engaging an external thread 66 of an adapter 64 provided at its rear portion with a stem 34 and dual arm anchor 36 as described above with reference to FIG. 4 and preferably made of high tensile strength steel. The cutter 60 and adapter 64 are tightened to form a single unit that is used in the same way as the integral cutter 16 described above. The benefits of the second embodiment include cheaper production cost of the cutter and stronger link to the shank by usage of the more suitable high tensile steel instead of the cutter material which is typically tough and brittle. It will be noted that positional accuracy is maintained by virtue of the rear stop face 30 and the conical centering portion 32, which remain associated with the cutter 60 rather than the adapter 64.

Figure 7:
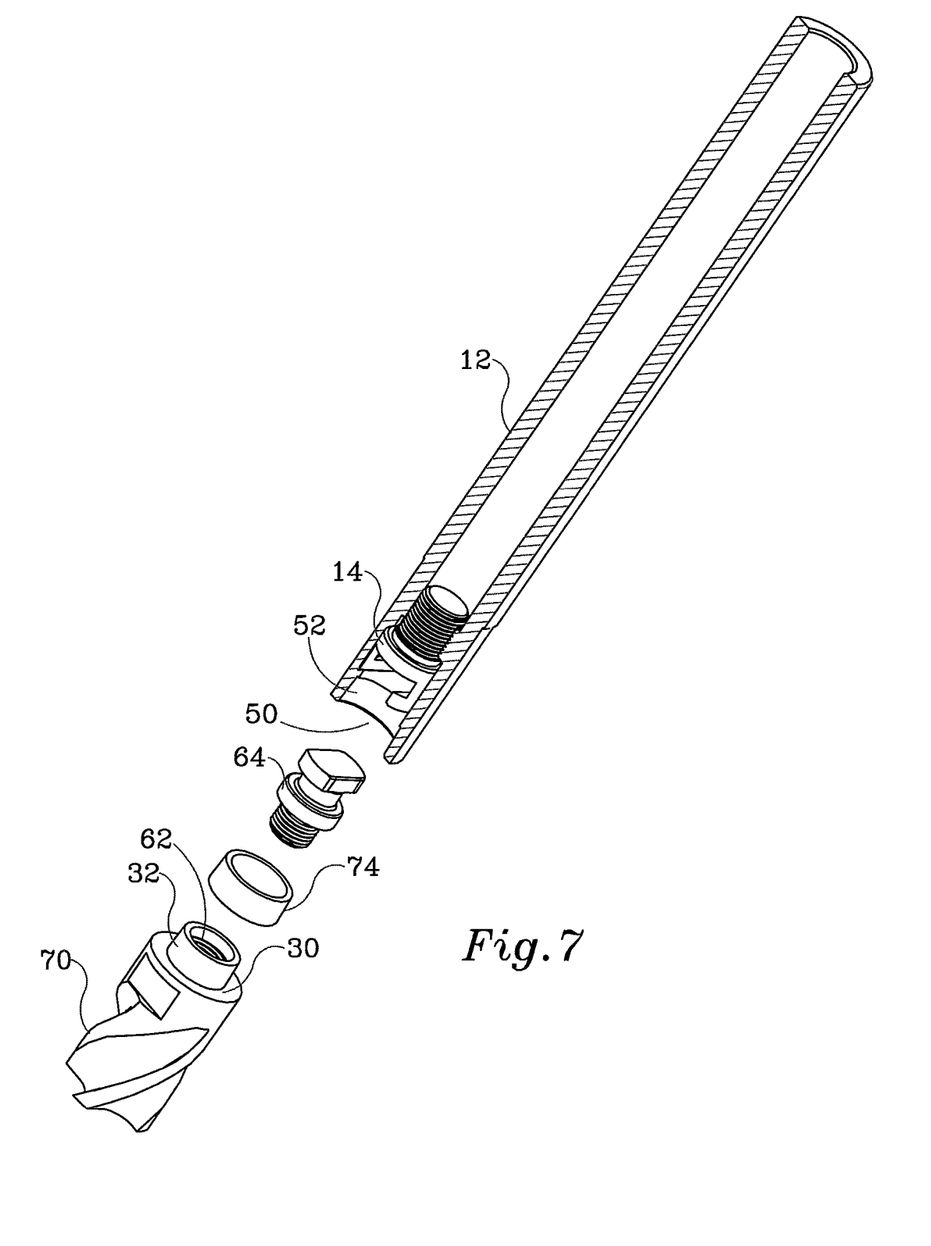
FIG. 7 is an exploded perspective view of a quick change cutting tool according to a third embodiment of the present invention.
Figure 8:
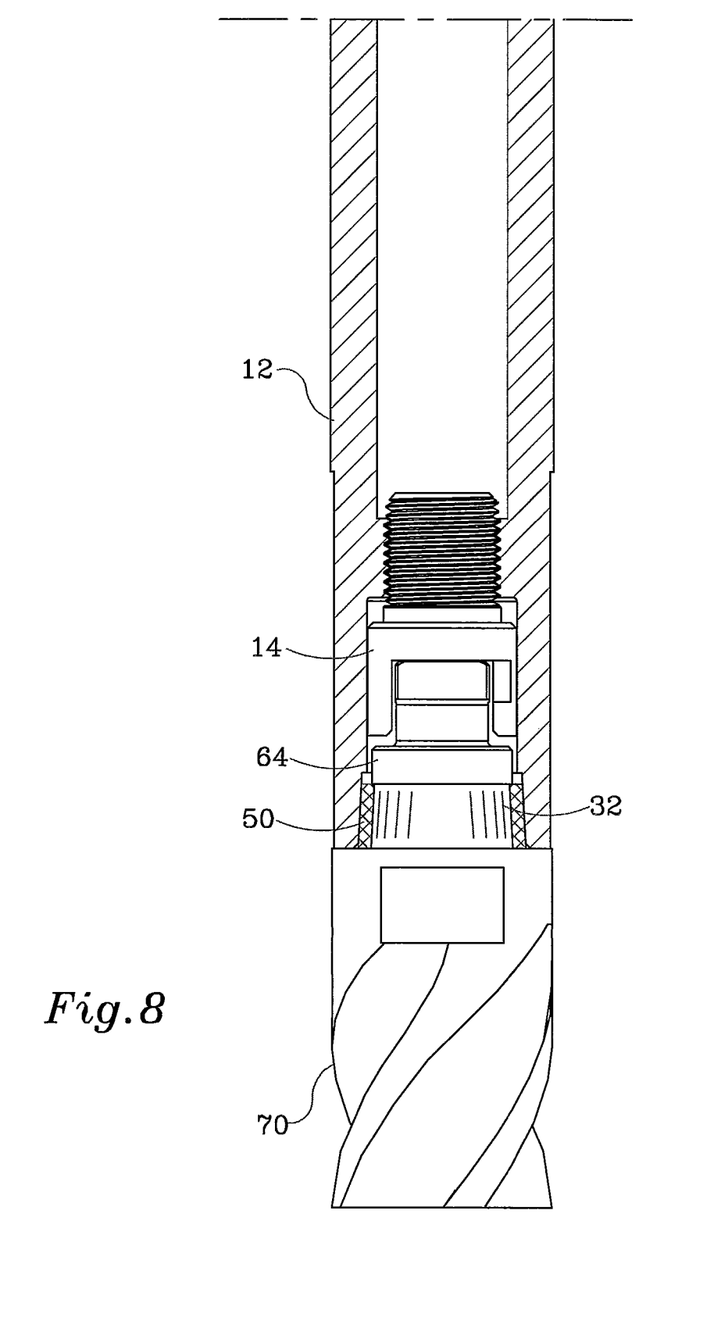
FIG. 8 is an enlarged longitudinal cross-sectional view of the assembled quick change cutting tool shown in FIG. 7, the shank and the centering sleeve being shown in longitudinal section.

With reference to FIGS. 7 and 8, there is shown a cutter 70 according to a third embodiment that is similar to the first embodiment except that the conical centering portion 32 is smaller in diameter than the complementary conical centering portion 52 of the internal mounting bore 50 of the shank 12. An additional conical centering sleeve 74 preferably made of an elastic or semi-elastic material, fills the annular gap between the lower diameter conical centering portion 32 of the cutter 70, and the conical centering portion 52 of the internal mounting bore 50 of the shank 12. The benefits of the third embodiment include much easier production tolerances on both the conical centering portions 32 and 52 of the cutter and the shank respectively. The final locking of the cutter in position, slightly shrinks the wall thickness of the conical centering sleeve 74 such that the gap is precisely filled with the semi-elastic material of the centering sleeve 74. Additionally, the elastic conical centering sleeve 74 contributes to better shock absorption of the cutter and reduces the risk of undesired loosening of the joint during operation.

Figure 9:
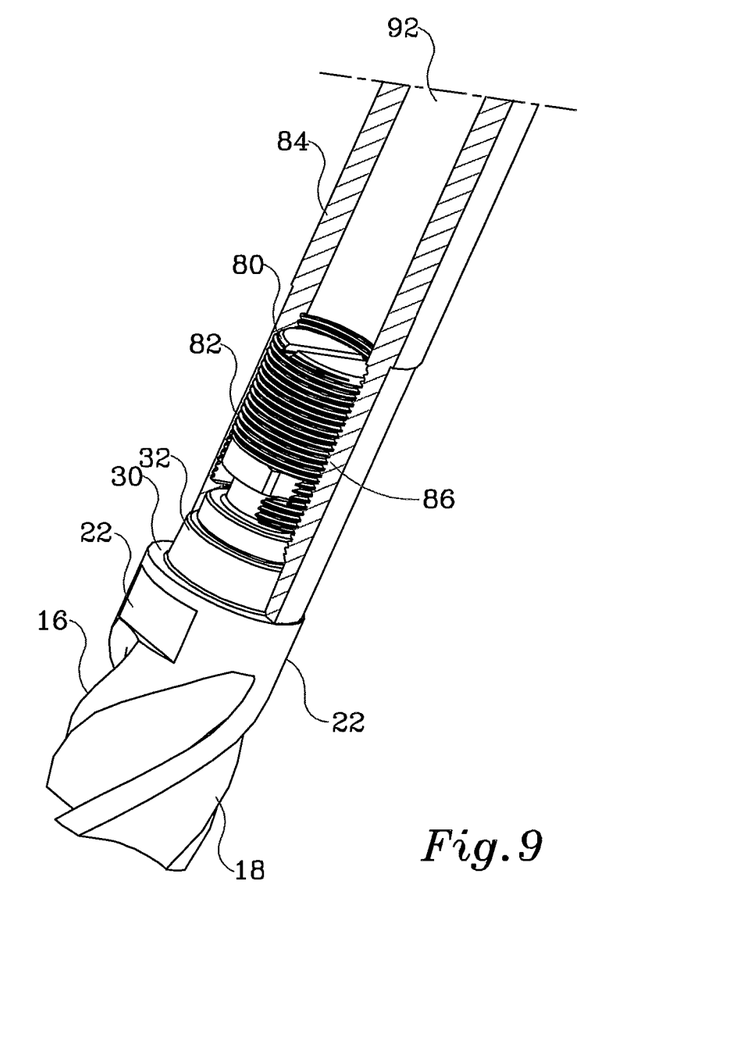
FIG. 9 is a perspective view of a quick change cutting tool according to a fourth embodiment of the present invention.
Figure 10A:
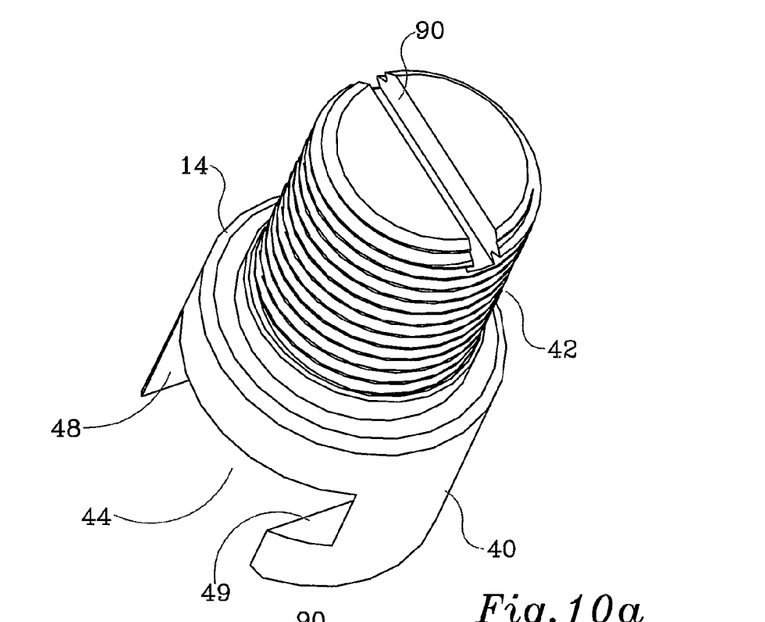
FIGS. 10a and 10b are enlarged rear end perspective views of the coupler shown in FIGS. 7 and 9, respectively.
Figure 10B:
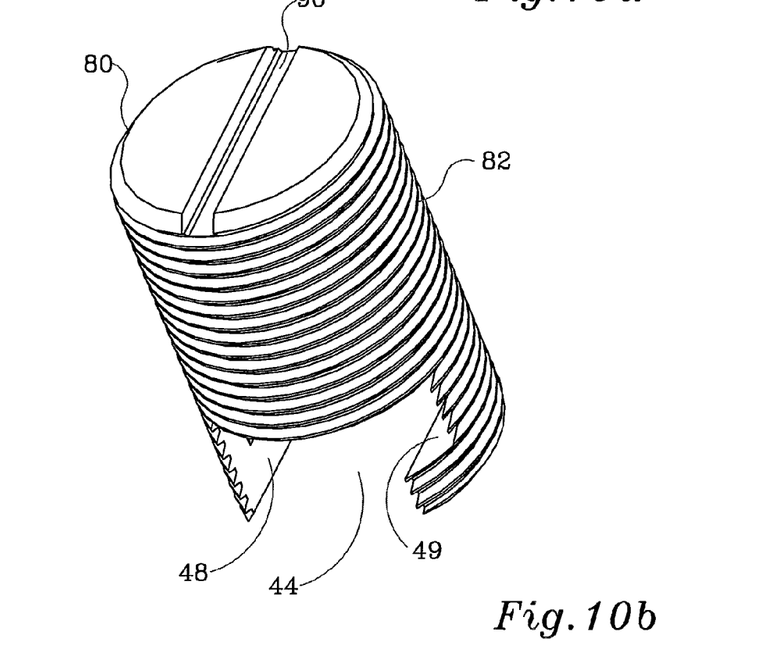

With reference to FIGS. 9 and 10b there is shown an alternative coupler 80 that is similar to the coupler 14 shown in FIG. 2 except that the cylindrical portion 40 and the coaxial male threaded portion 42 of FIG. 2 are replaced by a single portion having an external thread 82 over its entire length, with the transversal groove 44 and recesses 49 formed therein. An appropriate shank 84 is provided with a longer threaded portion 86 for engaging the entire length of the coupler 80. The coupler 80 and shank 84 made in accordance with this fourth embodiment are compatible with any of the cutters or combination of cutter, adapter and centering sleeve described above with reference to FIGS. 1 to 8. The threaded coupler 80 permits production of small quick change tools in the diameter range of below 10 mm. A standard headless set-screw can be modified for use as a coupler by cutting the groove 44 and recesses 49 on a wire EDM machine as described above.

Referring to FIGS. 10a and 10b, the couplers 14 and 80 according to any of the described embodiments of the present invention, may be provided with rear drive means such as a flat screwdriver slot 90, Philips crossed screwdriver slot, Allen key hexagon socket, "TORR®" key star shaped socket or any other drive means. The rear drive means may be required in cases where the cutter is excessively tightened during operation of the machine and the cutter is locked by too tight an engagement of the conical centering portion 32 of the cutter 16 in the conical centering portion 52 of the shank 12. In such cases the tool may be dismantled from the machine spindle and the rear drive means of the coupler accessed through the longitudinal bore 92 of the shank, the coupler being then rotated in the correct direction to slacken the tension and release the cutter.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

The invention claimed is:

1. A coupler for a quick change rotary cutting tool assembly allowing a cutter having an anchor projecting from a rear stop face of the cutter abutting a centering portion to be quickly and releasably coupled to a shank having a centering portion within an internal mounting bore, the coupler comprising:
   a cylindrical portion supporting at a rear end a coaxial male threaded portion for engaging an internal threaded bore of the shank, and
   a transversal groove diametrically formed through the cylindrical portion and being open toward a front end surface of the cylindrical portion so as to form an open channel having opposing parallel walls dimensioned to accommodate opposing parallel flat surfaces of an anchor mounted on a rear end of the cutter;
   a partial inside surface of a first one of the walls and an angularly opposing partial inside surface of a second one of the walls being undercut toward a lower surface of the groove so as to form a pair of angularly offset recesses at respective opposite ends of the groove that engage a retaining surface of the anchor when the anchor is inserted into the groove and rotated in a locking direction.

2. The coupler according to claim 1, wherein the anchor is made as a disk trimmed on both sides to form arms and parallel flats.

3. The coupler according to claim 1, wherein chamfers are provided along edges of the groove adjacent the front end surface of the cylindrical portion, for facilitating self-alignment of a replacement cutter within the groove.

4. The coupler according to claim 1, wherein said centering portion of the cutter and the centering portion of the shank are conical in shape.

5. The coupler according to claim 1, comprising an active fluted portion coupled to a short cylindrical portion having at least two opposing parallel flats for accommodating spanner.

6. The coupler according to claim 1, being of a type chosen from the group of: face mill, rounded tip mill, slitting mill, drill, reamer, or any other replaceable tip for milling, drilling, reaming or other metal cutting applications that use rotary cutting tools.

7. The coupler according to claim 1, wherein: the cylindrical portion and the male threaded portion are of equal diameter and are provided with an external thread over an entire length thereof, and the transversal groove and recesses are formed in the threaded portion.

8. The coupler according to claim 7, being formed from a headless set-screw by cutting said transversal groove and recesses on a wire EDM machine.

9. The coupler according to claim 1, being provided with rear drive means accessible through longitudinally passing bore made in the shank.

10. The coupler according to claim 9, wherein said drive means is chosen from the group of: flat screwdriver slot, Philips crossed screwdriver slot, Allen key hexagon socket, and star shaped socket.

11. A quick change rotary cutting tool assembly comprising:
   a shank having a centering portion within an internal mounting bore;
   a cutter having an anchor projecting from a rear stop face abutting a centering portion to be quickly and releasably coupled to the shank; and a coupler according to claim 10,
wherein the shank comprises:
- an internal mounting bore situated at a front end thereof so as to form an annular front edge that serves as a stop face,
- a centering portion that is complementary to a centering portion of the cutter at a front end of the internal bore,
- a free cavity rearward of the centering portion of sufficient depth to accommodate the cylindrical portion of the coupler, and
- a female threaded bore rearward of the free cavity sized to accept the male threaded portion of the coupler.

12. The quick change rotary cutting tool assembly according to claim 11, wherein an internal diameter of the free cavity is made in close tolerance to the diameter of the cylindrical portion of the coupler.

13. The quick change rotary cutting tool assembly according to claim 11, wherein the anchor is made as a disk trimmed on both sides to form a pair of curved retaining arms and parallel anchor flats.

14. The quick change rotary cutting tool assembly according to claim 13, wherein chamfers are provided along edges of the anchor flats and along the front edges of the groove of the coupler, for facilitating self-alignment of a replacement cutter within the groove.

15. The quick change rotary cutting tool assembly according to claim 11, wherein the cutter includes an active fluted portion coupled to a short cylindrical portion.

16. The quick change rotary cutting tool assembly according to claim 14, wherein the cylindrical portion is equipped with at least two opposing parallel flats for allowing the insert to be gripped by a spanner.

17. The quick change rotary cutting tool assembly according to claim 11, wherein the cutter is of type chosen from the group of: face mill, rounded tip mill, slitting mill, drill, reamer, or any other replaceable tip for milling, drilling, reaming or other metal cutting applications that use rotary cutting tools.

18. The quick change rotary cutting tool assembly according to claim 11, wherein upon assembly of the cutting tool by insertion of the coupler into the mounting hole of the shank, followed by insertion of the cutter anchor into the groove of the coupler, and rotation in the locking direction, both the stop face and centering portion of the cutter are simultaneously tightened against the stop face and the centering portion of the shank.

19. The quick change rotary cutting tool assembly according to claim 11, wherein the anchor is attached to an adapter having an external male thread for threadably engaging an internal thread of the cutter.

20. The quick change rotary cutting tool assembly according to claim 19, wherein the adapter is made of high tensile strength steel.

21. The quick change rotary cutting tool assembly according to claim 11, wherein the centering portion of the cutter and the shank are conical in shape.

22. The quick change rotary cutting tool assembly according to claim 21, further including a conical centering sleeve made of a resilient material for filling a gap formed between the conical centering portion of the cutter and the conical centering portion of the shank.

23. The quick change rotary cutting tool assembly according to claim 11, wherein:
- the cylindrical portion and the male threaded portion of the coupler are of equal diameter and are provided with an external thread over an entire length thereof,
- the transversal groove and recesses are formed in the threaded portion, and
- the shank has a threaded portion of sufficient length to accommodate the entire length of the coupler.

24. The quick change rotary cutting tool assembly according to claim 23, wherein said coupler is formed from a headless set-screw by cutting said transversal groove and recesses on a wire EDM machine.

25. The quick change rotary cutting tool assembly according to claim 11, wherein said coupler is provided with rear drive means accessible through longitudinally passing bore made in the shank.

26. The quick change rotary cutting tool assembly according to claim 25, wherein said drive means are chosen from the list of, flat screwdriver slot, Philips crossed screwdriver slot, Allen key hexagon socket, and star shaped socket.

\* \* \* \* \*